April 28, 1931. H. JUNKERS 1,802,719
RIVETING DEVICE
Filed May 28, 1925 3 Sheets-Sheet 1
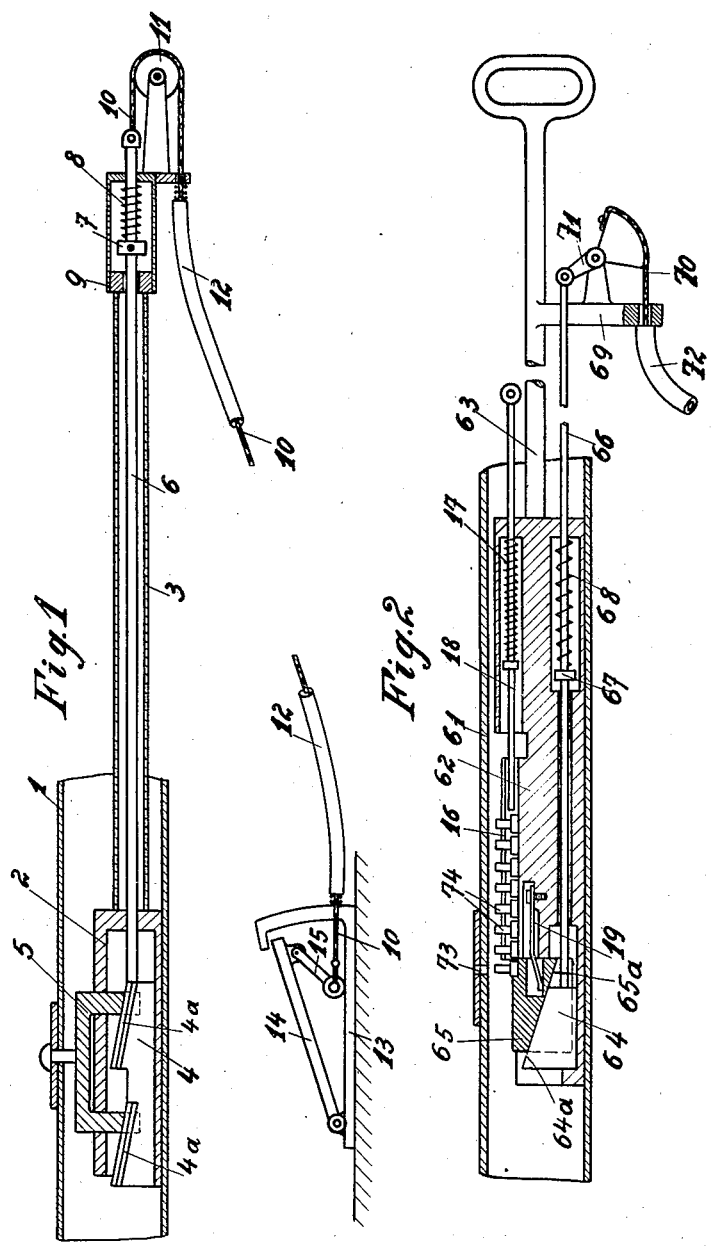
Inventor:
Hugo Junkers
by [signature]
Atty.

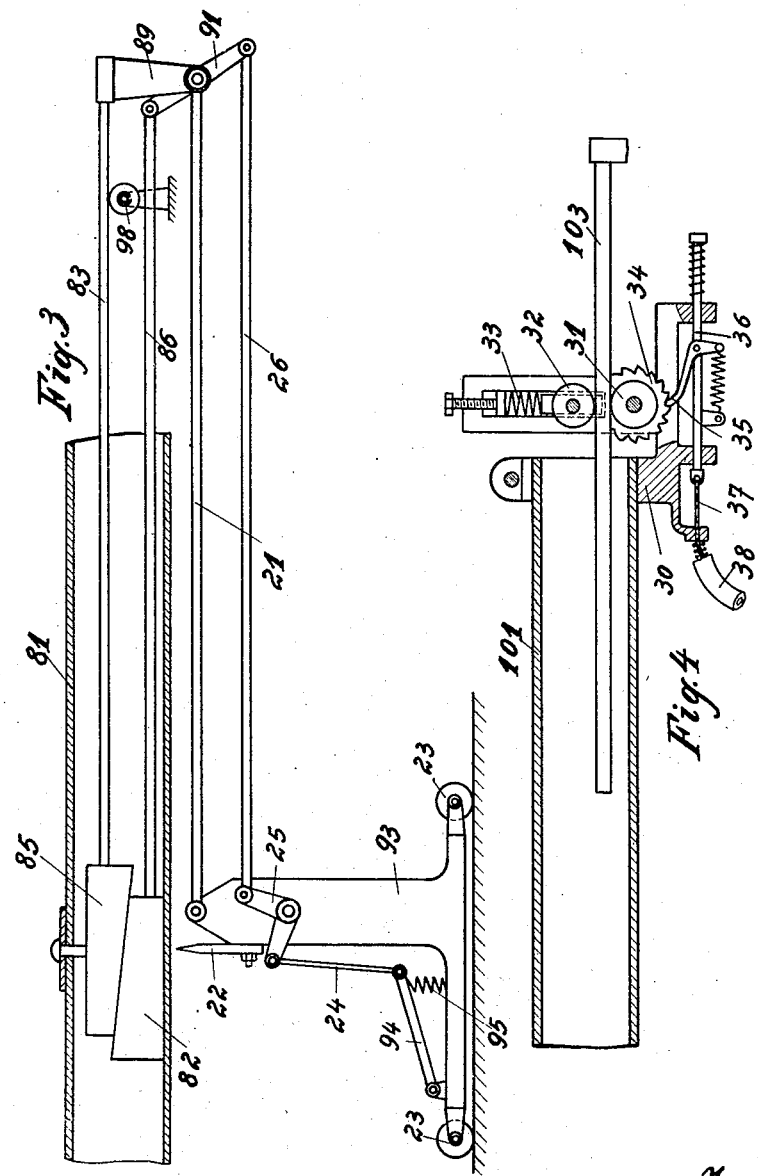

April 28, 1931. H. JUNKERS 1,802,719
RIVETING DEVICE
Filed May 28, 1925 3 Sheets-Sheet 3
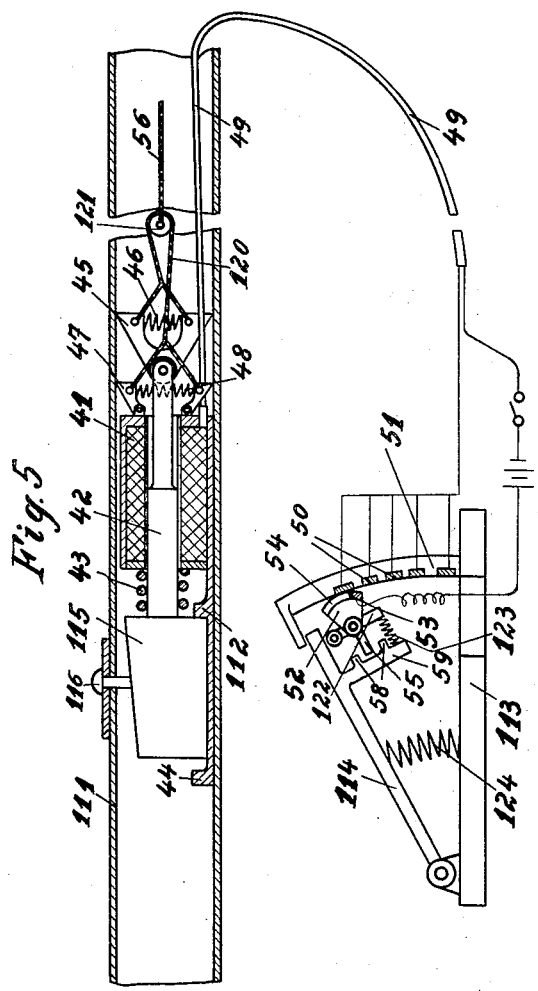
Inventor:
Hugo Junkers
by Atty.

Patented Apr. 28, 1931

1,802,719

UNITED STATES PATENT OFFICE

HUGO JUNKERS, OF DESSAU, GERMANY

RIVETING DEVICE

Application filed May 28, 1925, Serial No. 33,481, and in Germany August 27, 1924.

My invention refers to the riveting of tubes and other hollow work pieces and it more particularly concerns a device for riveting axially extending joints of and for securing accessory parts on tubes and the like in an easier and more perfect manner than has hitherto been possible. In order to rivet tubes and other hollow bodies the interior of which is accessible only from the ends and which shall not be moved during the riveting operation devices have been used which are inserted and moved axially in the tubes or the like, such devices either serving as an adjustable abutment or anvil for rivets acted upon from without or which are arranged to insert the rivets in the holes from within.

The present invention is designed to improve this type of riveting device in that the abutment or anvil inserted in the tube can be displaced by means operable from the stand of the operator who does the riveting proper, i. e. from a point outside and between the ends of the tube. In the devices hitherto used an assistant was required besides the operator for displacing the anvil or abutment in proportion as the riveting proceeded. This assistant also had to carefully adjust the anvil or abutment relatively to the rivet hole and to the wall of the tube. In contradistinction thereto the operator using the novel device can dispense with an assistant partly or altogether and is enabled to quickly and correctly displace and/or adjust the abutment or anvil whereby the riveting operation is greatly simplified and expedited.

The invention is adapted for use with riveting devices in which the rivet is inserted into the hole from without, the closing head being formed on an adjustable abutment which is adjusted by means of the device according to this invention which is controlled by the operator. The invention is, however, also adapted for use with such riveting devices which cause the rivet to be inserted into the hole from within, the device being provided with a store of rivets which are fed singly into the rivet holes. In either case the device according to this invention can be arranged in such manner that it allows also displacing the anvil from one hole to the other, this being effected from the operator's stand also. The device according to the present invention can either have the form of rods and links extending from the anvil or abutment to the open end of the tube and around its edge back to the operator's stand near the said abutment or else it may comprise flexible power transmitting means, such as a Bowden train or a pneumatic or hydraulic gear, for instance such as used in connection with pneumatic hammers, or an electric gear comprising a solenoid or the like may be inserted therein in such manner that the anvil is enabled by the transmission of power from without to automatically displace itself within the tube and to execute the further necessary movements, at the same time taking the power transmission gear along with it.

In the drawings affixed to this specification and forming part thereof several devices embodying my invention are illustrated diagrammatically by way of example. In the drawings Fig. 1 is a longitudinal section of a device controlled by mechanical means including a Bowden train and which is adapted for cooperation with rivets introduced from without.

Fig. 2 is a like view of a device of a similar kind arranged for the feeding of the rivets from within.

Fig. 3 is a device in which the anvil is operated by mechanical means other than those shown in the preceding figures.

Fig. 4 is an elevation partly in longitudinal section of means operable from the operator's stand and capable of being mounted on the tube to be rivetted for displacing the anvil.

Fig. 5 is a longitudinal section of an automatic device actuated by electric means for displacing the anvil.

In the device illustrated in Fig. 1, 1 is the tube to be riveted and 2 is a sleeve forming part of the anvil, this sleeve being adapted to be displaced longitudinally by means of a tubular handle 3 projecting from one end of the tube. 4 is an abutment longitudinally displaceable in the sleeve 2 and presenting two cam faces 4a on which rests the anvil proper 5 which can thus be displaced vertically with relation to the wall of the tube and to the rivet by a gradual displacment of the abutment 4. This displacement is brought about by a rod 6 extending across the tubular handle 3 and carrying on its projecting end a collar 7 and a coil spring 8, one end of which rests against the end plate of a tubular head 9 mounted on the handle 3. To the end of rod 6 which projects from the end plate is attached the wire 10 of a Bowden train 12, this wire passing around a sheave 11. The Bowden train and wire 10 end in a pedal lever arrangement mounted at the operator's stand near the point where the anvil is located within the tube, 14 being the pedal lever and 15 being a link pivoted to the lever and having the end of wire 10 attached to its lower end.

In the device here described the sleeve 2 and anvil 5 are displaced from one rivet hole to the other by an assistant displacing these parts by means of the tubular handle 3. However, as this is all the assistant has to do the work can be done by unskilled labor. The vertical adjustment of the anvil 5 which must be effected very carefully and according to the conditions prevailing in each individual case during the riveting operation is carried out by the operator himself who acts on the pedal lever 14 which together with the foundation plate 13 to which it is pivoted can easily be pushed along on the ground whenever the operator changes his stand and by gradually displacing the lever, the abutment 4 is gradually displaced so as to gradually raise the anvil 5 in a direction towards the rivet.

In the modifications disclosed in Fig. 2, 62 is a cylindrical body carrying a supply of rivets and 63 is a handle projecting from the tube and serving to displace it from without. 16 is a supply of rivets and 18 is a pusher rod acted upon by a coil spring 17 and serving to supply to the anvil proper 65, one rivet 74 after the other to be inserted in a rivet hole such as 73. The anvil 65 is kept in inoperative position by a spring 19. It rests with its bottom cam face 65a on a similar cam face 64a of the abutment 64 and by displacing the abutment 64 to the right the anvil 65 will be raised against the action of spring 19 for the insertion in the hole of the rivet deposited thereon. 66 is a rod attached to the abutment 64 and extending through a boring of the body 62. 67 is a collar fixed on this rod and 68 is a coil spring encircling it and tending to move it to the left. 69 is an arm depending from handle 63 and having pivoted to it a double-armed lever 71 having one arm linked to the outer end of rod 66, while to its other arm is attached the wire 70 of a Bowden train 72 leading to a pedal lever device such as shown in Fig. 1. The body 62 as well as the rivets are operated by an assistant by means of handle 63 and rod 18. The vertical adjustment of the anvil 65 is controlled by the operator acting on the pedal lever and through it on rod 66 and abutment 64.

Referring now to Fig. 3, 82 is the abutment and 85 is the anvil, resting with its bottom cam face on the top cam face of the abutment. 83 is a controlling rod secured to the anvil 85, and 86 is a similar rod attached to the abutment 82. Rod 83 is supported by a roller 98 mounted in front of the operating end of the tube 81. To the free end of rod 83 is attached an arm 89 having pivoted to it a double armed lever 91, the upper end of which is pivoted to the free end of rod 86 while the lower arm is pivoted to a rod 26 extending in parallel with 86. 21 is a rod extending from the lower end of arm 89 to a standard 93 mounted on rollers 23 and carrying the pedal lever 94 held in inoperative position by a coil spring 95. To the free end of the pedal lever 94 is pivoted a link 24 leading to one arm of the bell crank lever 25 connected with rod 26. A pointer 22 is fixed to the standard 93 in vertical position.

In this case the operator by displacing the standard 93 can also displace the abutment 82 and anvil 85. By actuating the pedal lever 94 he can pull the abutment 82 to the right without at the same time displacing the anvil 85 in longitudinal direction, the anvil being raised by the cam face of the abutment acting on its bottom cam face. Obviously this device allows the operator to dispense with an assistant altogether.

The device shown in Fig. 4 is designed for use in connection with an abutment and anvil of the kind described with reference to Figs. 1 to 3. It comprises novel means for displacing the abutment in the tube 101 being clamped to the free end of the tube by means of a bracket 30. The handle 103 serving to operate the abutment (not shown) is guided between two superposed rollers 31 and 32, the top roller being pressed onto the rod 103 by a coil spring 33, while the bottom roller 31 is connected with a ratchet wheel 34 acted upon by a spring actuated pawl 35 pivoted to a displaceable rod 36 controlled by the wire 37 of a Bowden train 38 which leads to a pedal lever device such as described with reference to Fig. 1.

Obviously the operator by actuating the pedal lever will exert a pull on the rod 36 thereby actuating also the ratchet wheel 34 and turning the roller 31 whereby the handle 103 and the abutment fixed to it will be displaced longitudinally in the tube 101, the spring actuated roller 32 serving for maintaining the handle in the position imparted to it. By means of another pedal lever device the operator may act on the anvil and the rivet supply such as shown in Fig. 2.

In the electric device disclosed in Fig. 5, 111 is the tube to be operated upon and 112 is the longitudinally displaceable abutment on which rests the wedge-shaped anvil 115 which on being displaced longitudinally of the tube will gradually approach the rivet hole. A longitudinal movement of the anvil 115 relatively to the abutment 112 is obtained by means of a solenoid 41, the core 42 of which is fixed to the anvil 115, a coil spring 43 being interposed between the anvil and the solenoid which is mounted on an extension of the abutment 112. The free end of the core is pivoted to a pair of pointed pawls 45 spread apart by a coil spring 46 which tends to force the points of the pawls into the wall of the tube 111. Another pair of pointed pawls 47 is pivoted to the solenoid 41 and spread apart by a coil spring 48. The free ends of the pawls 47 and 45 are interconnected by a string 120 passing around a sheave 121 which can be acted upon by a wire 56. By pulling this wire and the string 120 the pawls 45 and 47 will be acted upon against the action of springs 46 and 48, respectively, so as to carry them out of contact with the walls of the tube. From the solenoid 41 a cable 49 leads to the contact pieces 50 mounted on a segment 51 forming part of the pedal lever device 113, 114. Pedal lever 114 has pivoted to its free end an arm 122 acted upon by a coil spring 123 which rests against an arm 59 extending at right angles to the pedal lever 114 and carrying two stops 58. To the movable arm 122 is pivoted a contact finger 52, an extension 55 of which projects between the stops 58 thereby limiting the oscillatory movement of the contact finger. 54 is an insulating piece and 53 a contact piece mounted on the contact finger 52.

On the pedal lever 114 being depressed the contact finger 52 being in frictional contact with the segment 51 will cause the contact piece 53 of the contact finger 52 to make contact with one after the other of the contact pieces 50 on the segment 51, thereby sending electric impulses into the solenoid 41. On the other hand when the pedal lever 114 is released and raised by its spring 124 the contact finger 52 will be caused by friction to be oscillated until its extension 55 is caught by the upper stop 58 whereby the contact piece 53 is thrown out and the insulating piece 54 will glide past the contacts 50 whereby the circuit is interrupted. Each of the current impulses generated only when depressing the peral lever causes the solenoid coil 41 and abutment 112 to be moved to the left, the core 42 being held stationary by the pawls 45 resting against the inner wall of the tube 111. After the current has been interrupted spring 43 resting against the solenoid core 42 will push the anvil 115 to the left until it meets a stop 44 on the abutment 112, thereby causing the operative part of the surface of the anvil to approach the rivet hole and the rivet itself which is acted upon with the hammer as usual. In order to shift the abutment 112 and anvil 115 from one rivet hole to the next succeeding one the pedal lever 114 is actuated several times in quick succession.

Obviously, the handles shown in Figs. 1 to 4 which serve for displacing the abutment can also be replaced by a device controlled from the operator's stand and provided with pulling members, such members extending for instance from the anvil or abutment across the sheave at one end of the tube and to another sheave at the other end and from this sheave to the operator's stand. In a device of this kind a pull at the free end of the member (which may be a rope, cable, chain or the like) will cause the abutment or anvil to be displaced in the same sense. A similar rope can be made to extend in the opposite direction so that the operator is at liberty to move the abutment and anvil in either direction without leaving its stand. These two ropes can also have the form of endless loops connected with each other in one point, one of the loops being connected with the abutment or anvil, while the other is provided with a grip for the operator, the position of this grip then corresponding to the position of the abutment and anvil for the time being.

I wish it to be understood that I do not desire to be limited to the exact details of construction shown and described, for obvious modifications will occur to a person skilled in the art.

I claim:—

A tube riveting apparatus comprising an abutment axially displaceable in the tube, an anvil associated with said abutment and movable in a radial direction, a movable support exterior to the tube and adapted to be positioned substantially in the radial plane of the tube passing through a rivet therein that is to be operated upon, means mounted upon said support and connected to the abutment and anvil assembly for effecting radial movement of said anvil, and for maintaining said abutment and anvil assembly in operative relation to the rivet and to the support, positioned as aforesaid, said means extending inside the tube from the anvil to the end of the tube and back to the support aforesaid outside the tube, whereby movement of the support is transmitted through said connecting means to move said abutment and anvil assembly in position for subsequent riveting operations as said support is moved to its corresponding position.

In testimony whereof I affix my signature.

HUGO JUNKERS.